US012674465B2

(12) United States Patent
Lin et al.

(10) Patent No.: US 12,674,465 B2
(45) Date of Patent: Jul. 7, 2026

(54) FAN SHAFT STRUCTURE

(71) Applicant: Global WIN Technology Co., Ltd., Taipei City (TW)

(72) Inventors: Shih-Jen Lin, Taipei City (TW); Ching-Yao Chen, Taipei City (TW)

(73) Assignee: Global WIN Technology Co., Ltd., Taipei City (TW)

( * ) Notice: Subject to any disclaimer, the term of this patent is extended or adjusted under 35 U.S.C. 154(b) by 0 days.

(21) Appl. No.: 18/659,669

(22) Filed: May 9, 2024

(65) Prior Publication Data

US 2025/0084861 A1    Mar. 13, 2025

(30) Foreign Application Priority Data

Sep. 7, 2023    (TW) ................................. 112134107

(51) Int. Cl.
| | |
|---|---|
| *F04D 29/063* | (2006.01) |
| *F04D 25/06* | (2006.01) |
| *F04D 29/053* | (2006.01) |
| *F04D 29/056* | (2006.01) |
| *F16C 33/10* | (2006.01) |
| *H02K 5/16* | (2006.01) |
| *H02K 5/167* | (2006.01) |

(52) U.S. Cl.
CPC ......... *F04D 29/063* (2013.01); *F04D 25/062* (2013.01); *F04D 29/053* (2013.01); *F04D 29/056* (2013.01); *F04D 25/0626* (2013.01); *F16C 33/104* (2013.01); *H02K 5/163* (2013.01); *H02K 5/1675* (2013.01)

(58) Field of Classification Search
CPC .. F04D 29/0626; F04D 29/062; F04D 29/063; F04D 29/0613; F04D 29/056; F04D 29/057; F16C 33/104
See application file for complete search history.

(56) References Cited

U.S. PATENT DOCUMENTS

| | | | | |
|---|---|---|---|---|
| 5,343,104 A | * | 8/1994 | Takahashi | .............. H02K 5/225 |
| | | | | 310/90 |
| 5,436,519 A | * | 7/1995 | Takahashi | ........... F04D 29/0513 |
| | | | | 310/90 |
| 5,610,462 A | * | 3/1997 | Takahashi | ............ H02K 5/1675 |
| | | | | 310/90 |

(Continued)

*Primary Examiner* — Courtney D Heinle
*Assistant Examiner* — Behnoush Haghighian
(74) *Attorney, Agent, or Firm* — MUNCY, GEISSLER, OLDS & LOWE, P.C.

(57)                 ABSTRACT

A fan shaft structure includes a fan frame having an axle seat set therein with a stator silicon steel sheet set and a circuit board installed outside the axle seat, a fan blade set in the fan frame holds a rotor magnet therein relative to the outside of the stator silicon steel sheet set, and a rotating shaft has one end assembled at the fan blade and its other end assembled in the axle seat. The outer part of the rotating shaft located in an accommodating groove is mounted with bearings, oil-containing members and oil-retaining caps. The oil film on the inner diameter of the oil-containing members can contact the rotating shaft to fill the gap between the oil-containing members and the rotating shaft, which can prevent external environmental dust, fine particles or foreign matter from penetrating between the rotating shaft and the bearings.

6 Claims, 10 Drawing Sheets

(56)                    References Cited

U.S. PATENT DOCUMENTS

| | | | | |
|---|---|---|---|---|
| 6,107,717 | A * | 8/2000 | Lin ..................... | H02K 5/1675 |
| | | | | 310/90 |
| 6,320,291 | B1 * | 11/2001 | Lin ....................... | H02K 5/163 |
| | | | | 310/67 R |
| 7,109,620 | B2 * | 9/2006 | Fujii ..................... | H02K 5/163 |
| | | | | 310/90 |
| 8,100,673 | B2 * | 1/2012 | Zhang .................. | F04D 29/051 |
| | | | | 384/279 |
| 8,123,475 | B2 * | 2/2012 | Yang .................... | F04D 25/062 |
| | | | | 415/220 |
| 2005/0104464 | A1 * | 5/2005 | Fujii ..................... | H02K 5/163 |
| | | | | 310/90 |
| 2006/0284503 | A1 * | 12/2006 | Lin ....................... | H02K 5/163 |
| | | | | 310/90 |
| 2006/0285982 | A1 * | 12/2006 | Lin ..................... | F04D 29/063 |
| | | | | 417/354 |
| 2009/0232678 | A1 * | 9/2009 | Yang .................... | F04D 25/062 |
| | | | | 417/410.1 |
| 2010/0172758 | A1 * | 7/2010 | Yang .................... | F04D 25/062 |
| | | | | 415/230 |
| 2017/0051758 | A1 * | 2/2017 | Sun ..................... | F04D 25/062 |

* cited by examiner

FAN SHAFT STRUCTURE

This application claims the priority benefit of Taiwan patent application number 112134107, filed on Sep. 7, 2023.

BACKGROUND OF THE INVENTION

1. Field of the Invention

The invention relates to a fan shaft structure, in particular to a structure that prevents grease spillage, dust intrusion and shaft current generation when the rotating shaft is in operation, which is based on assembling the fan blade in the accommodating space of the fan frame, then assembling the rotating shaft at the fan blade, and then equipping a bearing, an oil-containing member and an oil-retaining cap outside the rotating shaft to prevent grease spillage, dust intrusion, salt corrosion, and shaft current generation.

2. Description of the Related Art

Today's computers have powerful computing capabilities and their speeds are rapidly increasing to enhance the execution performance of computers. Since various electronic components such as the central processing unit (CPU), image processor, power supply or various interface cards inside the computer host have ultra-high-speed computing functions, various electronic components will generate relatively large amounts of high temperature heat energy when processing computing instructions. The high temperature heat energy also causes the temperature inside the computer host to rise. Due to poor heat dissipation performance, the heat dissipation devices, fans, etc. used to assist various electronic components in dissipating heat will cause unsatisfactory air convection inside the computer host, which will cause the computer host to overheat and cause crashes or forced shutdowns, and may even cause malfunction or damage to various electronic components inside the computer host. Therefore, how to use a good heat dissipation system to effectively dissipate heat for various electronic components and operate normally at their allowed temperatures has become an important issue that the industry pays attention to.

Fans used in general dissipation systems are equipped with bearings on the rotating shaft of the fan blade, and there must be a predetermined gap between the bearings and the rotating shaft so that the bearings can assist the rotating shaft to rotate smoothly. However, because there is a gap between the rotating shaft and the bearings, it is easy for the fine dust introduced when the fan blade rotates to fall into the gap between the rotating shaft and the bearings. The dust increases the frictional resistance between the rotating shaft and the bearings, affecting the smooth rotation of the rotating shaft. In addition, the rotation between the rotating shaft and the bearings in the fan blade must be properly lubricated to prevent friction noise from being too dry between the rotating shaft and the bearings. Usually, in order to solve the problem of excessive dryness caused by rotation between the rotating shaft and the bearings, the industry will use porous oil-containing self-lubricating bearings to reduce the noise caused by dry friction between the rotating shaft and the bearings. However, because the grease released by the self-lubricating bearing rotating with the rotating shaft, it easily overflows outside the rotating shaft, causing premature failure due to dryness between the rotating shaft and the bearings, or external environmental foreign matter such as acids, alkalis, and salts can easily penetrate into the space between the rotating shaft and the bearings to destroy the surface smoothness of the bearings and the rotating shaft, causing the fan to easily malfunction, and reducing the service life of the fan.

In addition, the bearings used in general dissipation fans at the rotating shaft are metal ball bearings or copper sintered oil bearings. Because the material of the bearings and the rotating shaft are both made of metal, when the fan leaves the factory, the bearings and the rotating shaft are coated with lubricating oil and do not conduct electricity. Instead, they become insulated circuits, forming different potential differences. However, when the fan runs for a long time, the lubrication between the bearings and the rotating shaft will be lost, and the rotating shaft and the bearings will form metal friction with each other, causing noise and static electricity due to friction. When the potential difference generated during the operation of the rotating shaft and the bearings accumulates to a certain extent and the oil film is lost to conduct electricity, which releases voltage and generates sparks, causing electrical corrosion between the rotating shaft and the bearings. This means that the temperature of the sparks causes damage to the surface roughness of the rotating shaft and the bearings, thereby reducing the service life of the fan. In addition, when the fan is operating, it is easy for external environmental dust, fine chips, or foreign matter such as acids, alkalis and salts to penetrate, causing friction losses and other defects between the metal rotating shaft and the bearings.

Therefore, how to solve the problem that when the rotating shaft and the bearings of the fan rotate, the lubricating grease is prone to drying out, spilling, and dust intrusion, and the trouble and inconvenience of easy generation of noises due to insufficient lubrication between the rotating shaft and the bearings, or even the problem of chemical corrosion and shaft current caused by acids, alkalis, and salts is the direction that relevant manufacturers in this industry are eager to research and improve.

SUMMARY OF THE INVENTION

The main purpose of the fan shaft structure of the present invention is that the fan frame comprises an accommodating space, an axle seat with an accommodating groove protruded in the accommodating space for the stator silicon steel sheet set and circuit board of the driving unit to be mounted on the outside of the axle seat; the fan blade is assembled in the accommodating space and has a hub for the rotor magnet of the driving unit to be mounted in the hub relative to the outside of the stator silicon steel sheet set; the rotating shaft has one end thereof assembled at the fan blade and an opposite end thereof extended into the accommodating groove assembled on the axle seat, and the outer part of the rotating shaft located in the accommodating groove is mounted with at least one bearing, at least one oil-containing member stacked on the at least one bearing, and an oil-retaining cap. After the oil-containing member is filled with oil, the oil film on its inner diameter can contact the shaft core to fill the gap between the oil-containing member and the rotating shaft (i.e., the shaft core), which can replenish lubricating oil for the porous oil-bearing that has lost lubricating oil due to the long-term operation of the rotating shaft, and can also prevent lubricating oil from overflowing and prevent external environmental dust, fine chips, or foreign matter such as acids, alkalis and salts from penetrating between the rotating shaft and the bearing. It makes the rotation of the rotating shaft and the bearing more stable, thereby reducing the friction and noise caused by the rotation between the rotating shaft and the bearing, and extending the service life of the fan.

Another object of the present invention is to provide a respective retaining ring between the axle seat and the bearing or between the oil-containing member and the bearing (the oil-retaining cap can also serve as a retaining ring if necessary), and the rotating shaft at the upper and lower positions corresponding to the retaining rings can be provided with a respective rotating shaft groove, so that the inner holes of the retaining rings can be mounted in the rotating shaft grooves respectively, and the diameter of the shaft hole of the retaining ring is smaller than the outer diameter of the rotating shaft and larger than the outer diameter of the rotating shaft groove, so as to prevent the rotating shaft from falling off the outside of the bearing.

Still another object of the present invention is that the rotating shaft is externally mounted with at least one bearing, and the bearing consists of conventional metal alloy porous sintered materials or in order to prevent shaft current and acid, alkali and salt corrosion, the bearing can be made of plastic material with a hardness of 50 HV, or in order to further increase the life of the bearing, the bearing can be made of composite plastic material with a hardness below 50 HV, self-lubricating properties, friction n coefficient less than 0.3, non-conductivity, and temperature resistance higher than 100 degrees C. [such as: PTFE (Teflon), PEEK (polyetheretherketone), Nylon (nylon), etc.].

DETAILED DESCRIPTION OF THE PREFERRED EMBODIMENT

In order to achieve the above-mentioned purpose and effect, the technical means adopted in the present invention, its structure and the method of implementation, etc., are hereby drawn in detail to illustrate the features and functions of the preferred embodiments of the present invention as follows, so as to facilitate a complete understanding.

Figure 1:
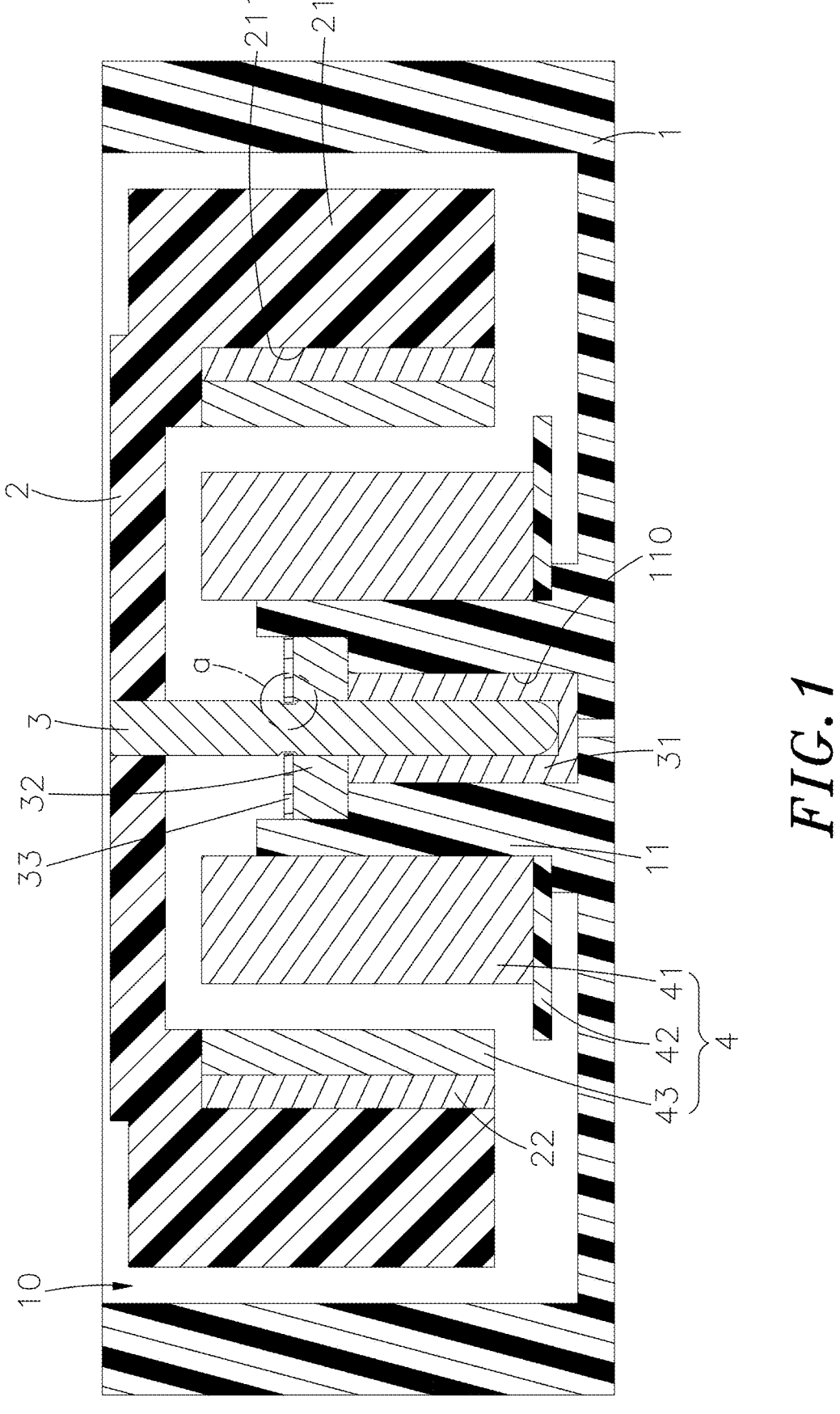
FIG. 1 is a side cross-sectional view of the first embodiment of the present invention.
Figure 2:
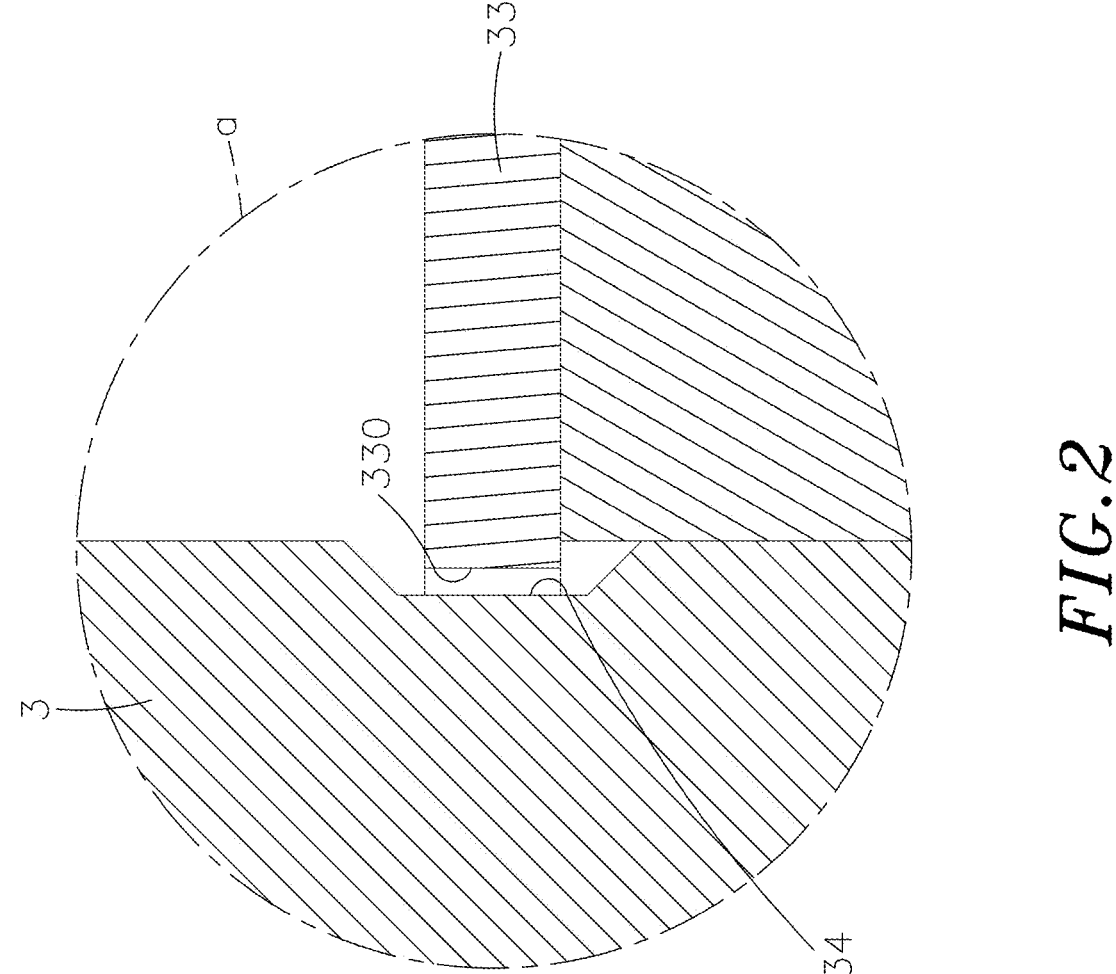
FIG. 2 is a partial enlarged view of part a of FIG. 1 of the present invention.
Figure 3:
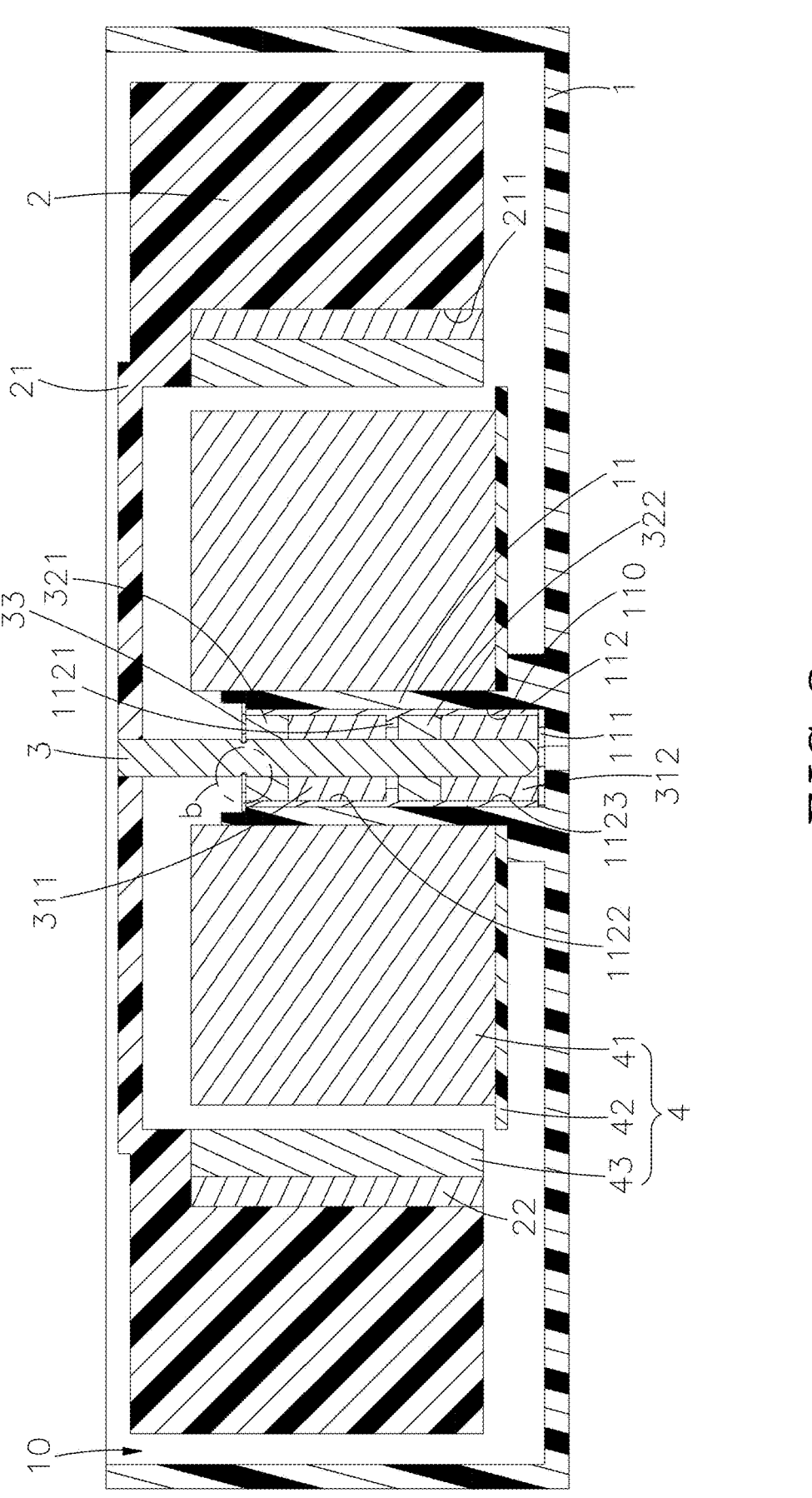
FIG. 3 is a side cross-sectional view of the second embodiment of the present invention.
Figure 4:
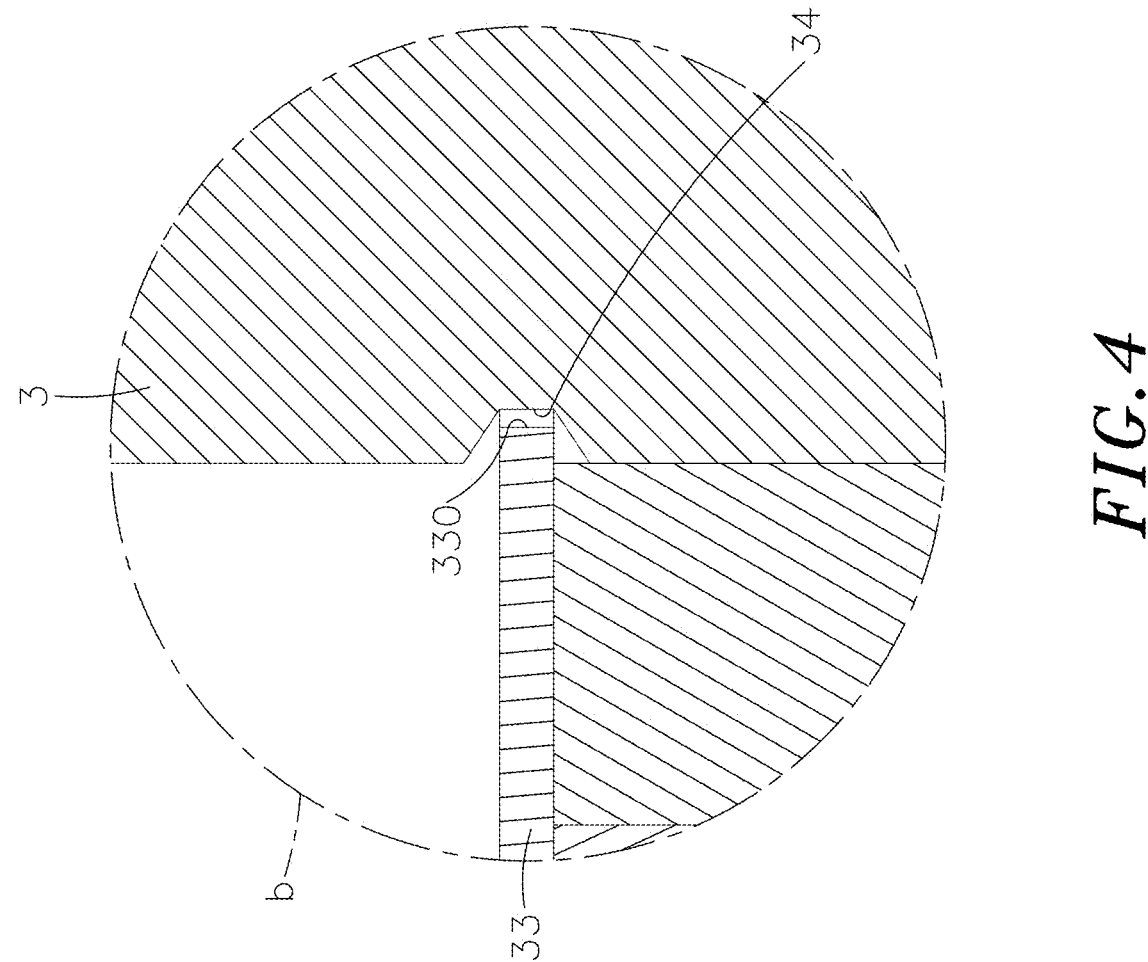
FIG. 4 is a partial enlarged view of part b of FIG. 3 of the present invention.

Please refer to FIGS. 1, 2, 3, and 4, which are the side cross-sectional view of the first embodiment of the present invention, the partial enlarged view of part a of FIG. 1 of the present invention, the side cross-sectional view of the second embodiment of the present invention, and the partial enlarged view of part b of FIG. 3 of the present invention. It can be clearly seen from the figures that the fan shaft structure of the present invention comprises a fan frame 1, a fan blade 2, a rotating shaft 3 and a driving unit 4, wherein:

The fan frame 1 comprises an accommodating space 10 inside, an axle seat 11 is protruded in the accommodating space 10. The axle seat 11 has an accommodating groove 110 inside. The stator silicon steel sheet set 41 (including multiple silicon steel sheets and enameled wire winding sets) and circuit board 42 of the driving unit 4 are installed outside the axle seat 11.

The fan blade 2 is assembled in the accommodating space 10 of the fan frame 1. The rotor magnet 43 of the driving unit 4 is arranged inside the fan blade 2, and the rotor magnet 43 is relatively located outside the stator silicon steel sheet set 41 (which includes multiple silicon steel sheets and enameled wire winding sets).

The rotating shaft 3 has one end thereof assembled on the fan blade 2 and an opposite end thereof extended into the accommodating groove 110 assembled in the axle seat 11 of the fan frame 1. There are at least one bearing 31 sleeved onto the rotating shaft 3, at least one oil-containing member 32 stacked on the at least one bearing 31, and at least one oil-retaining cap 33 stacked on the at least one oil-containing member 32 located in the accommodating groove 110 outside the rotating shaft 3. The at least one oil-retaining cap 33 is provided with a shaft hole 330, and the diameter of the shaft hole 330 can be slightly larger than the outer diameter of the rotating shaft 3 to ensure smooth rotation of the rotating shaft 3.

The above-mentioned at least one oil-containing member 32 mounted on the outside of the rotating shaft 3 of the present invention can be an elastic oil-absorbing sponge or other elastic oil-containing member 32 that can contain lubricating oil. After the oil-containing member 32 is filled with oil, the oil film on its inner diameter can contact the rotating shaft 3 to fill the gap between the oil-containing member 32 and the rotating shaft 3 (i.e., the shaft core), thereby preventing external environmental dust, fine particles or foreign matter such as acid, alkali and salt from penetrating between the rotating shaft 3 and the bearing 31. This allows the rotating shaft 3 and the bearing 31 to rotate more stably, be less likely to increase frictional resistance, and can also reduce losses caused by friction. This can also effectively reduce the noise generated by the rotation between the rotating shaft 3 and the bearing 31 to improve the quietness of the fan during operation and effectively extend the service life of the fan. The rotating shaft 3 can be provided with at least one rotating shaft groove 34, which is located relative to at least one retaining ring 35 and the oil-retaining cap 33, and the shaft hole 330 of the at least one retaining ring 35 or the shaft hole 330 of the oil-retaining cap 33 can be set in the rotating shaft groove 34. The hole diameter of the shaft hole 330 of the at least one retaining ring 35 or the shaft hole 330 of the oil-retaining cap 33 is smaller than the outer diameter of the rotating shaft 3 and larger than the outer diameter of the rotating shaft groove 34 to ensure smooth operation and allows the oil film on the inner diameter of the oil-containing member 32 to contact the rotating shaft 3 after containing oil, thus filling the gap between the oil-containing member 32 and the rotating shaft 3. This can prevent lubricating oil from being thrown out of the rotating shaft 3 when the fan blade 2 rotates, and can also prevent dust from intruding through the gap of the rotating shaft 3 and prevent the fan blade 2 from falling off the rotating shaft 3 and bearing 31 when rotating. And because the oil film on the inner diameter of the oil-containing member 32 is elastic and lubricating after being filled with oil, when the oil film on the inner diameter of the oil-containing member 32 contacts the rotating shaft 3, there will be no interference or abnormal noise to reduce the rotation speed of the fan blade 2, thereby keeping the inside of the bearing 31 clean and lubricated, so as to provide the fan with a good heat dissipation effect.

Figure 8:
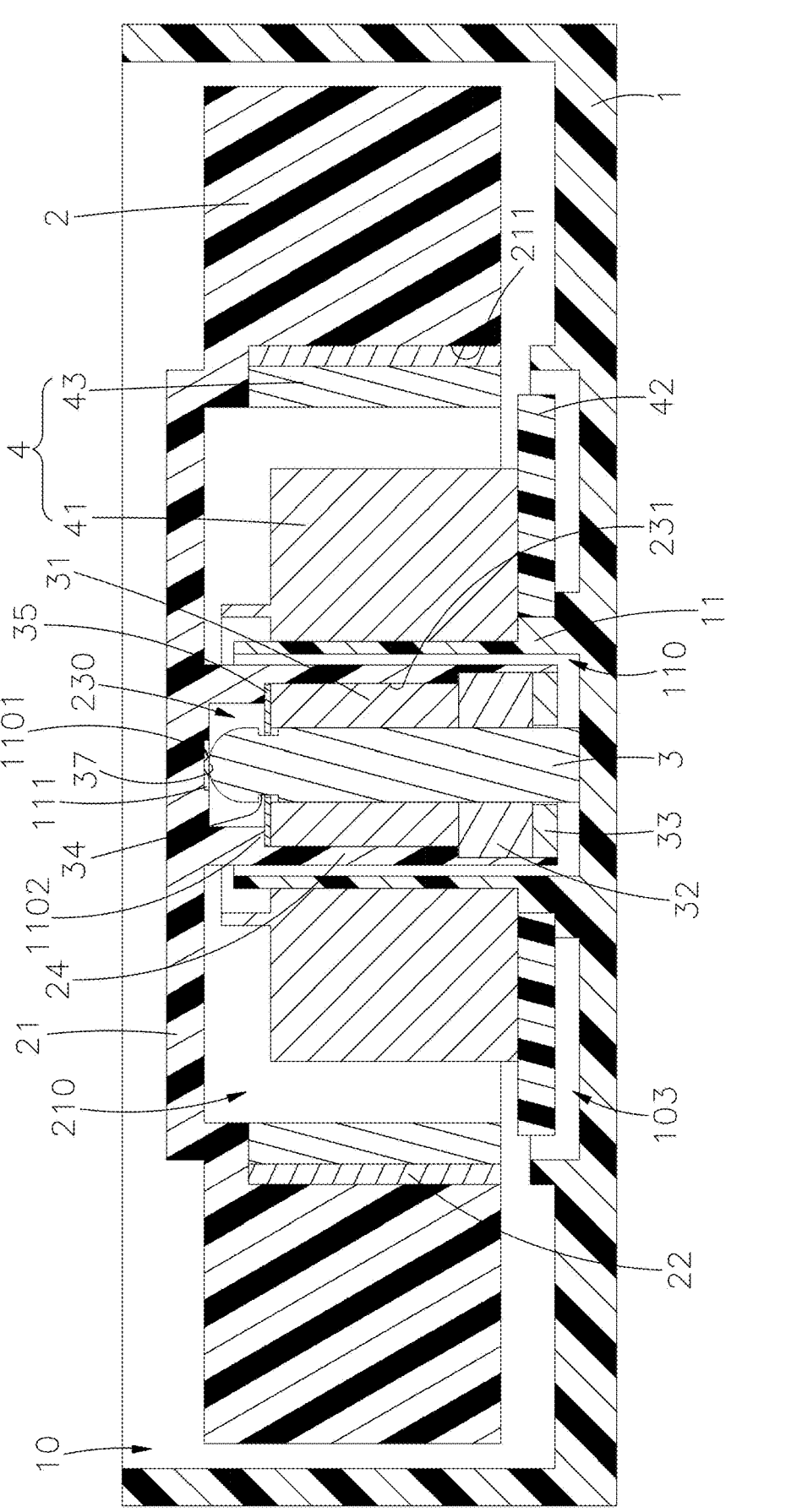
FIG. 8 is a side cross-sectional view of the sixth embodiment of the present invention.

In addition, please refer to FIG. 8. The fan blade 2 mentioned above can further comprise a hub 21 with a receiving space 210. The outer periphery of the receiving space 210 is provided with an iron shell 22, and the rotor magnet 43 is provided on the inside of the iron shell 22 relative to the stator silicon steel sheet set 41 of the driving unit 4. The central position of receiving space 210 is provided with a rotating shaft bearing seat 24 having a receiving groove 230 and a bearing groove 231. The bearing groove 231 is provided with at least one bearing 31, and at least one oil-containing member 32 stacked below the at least one bearing 31 and the bottom of the bearing groove 231 of the fan blade 2, and at least one oil-retaining cap 33 stacked below the oil-containing member 32. The rotating shaft 3 has one end thereof connected to the bottom center of the axle seat 11, and an opposite end thereof extended and assembled in the rotating shaft bearing seat 24 of the fan blade 2. There is a gap between the rotating shaft bearing seat 24 and the inner wall surface of the accommodating groove 110, so that the rotating shaft bearing seat 24 of the fan blade 2 can rotate freely and smoothly in the accommodating groove 110 of the fan frame 1.

The rotating shaft 3 is externally sleeved with at least one bearing 31. If the bearing 31 can be combined with the structure of the above-mentioned oil-containing member 32 and the bearing 31 is replaced with a plastic material or even a composite plastic bearing 31 with low friction coefficient, low hardness, non-conductivity, self-lubricating, anti-acid, anti-alkali and anti-salt corrosion, which will better prevent the accumulation of potential differences caused by long-term friction during rotation of rotating shaft 3 and bearing 31 from generating current (shaft current). Therefore, high-temperature electrical corrosion caused by sparks generated by current can be avoided, and the service life and range of use of the fan (in harsh environments such as dust, acid, alkali, and salt) can be improved, and the metal friction between the metal bearing 31 (generally copper or copper-iron sintered oil bearing 31 or metal ball bearing 31) and the metal rotating shaft 3 can also be reduced. Since both copper and iron are conductive materials, the generation of shaft current cannot be avoided and the high-frequency noise caused by metal grinding between the metal rotating shaft 3 (generally is SUS420, hardness above 300 HV) and the metal oil bearing 31, or between metal balls, metal inner race and metal outer race and the metal cage cannot be reduced. Therefore, the service life of the fan can be extended by avoiding the generation of shaft current.

Furthermore, the above-mentioned rotating shaft 3 is equipped with at least one bearing 31 on the outside. The bearing 31 can be a composite plastic material with hardness below 50 HV, self-lubricating properties, friction coefficient less than 0.3, non-conductive, and temperature resistance higher than 100° C. [such as: PTFE (Teflon), PEEK (polyether ether ketone), Nylon, etc] to further extend the life of the fan operation.

In addition, as shown in FIG. 3, the fan frame 1 of the present invention is provided with a wear-resistant gasket 111 at the bottom of the accommodating groove 110 of the axle seat 11, a bearing bracket 112 installed in the accommodating groove 110 on the wear-resistant gasket 111, and at least one isolation ring 1121 is protruded inside the bearing bracket 112. The outside of the rotating shaft 3 is mounted with at least two stacked upper bearings 311, an upper oil-containing member 321, a lower bearing 312, and a lower oil-containing member 322, which are respectively located in the upper space 1122 and lower space 1123 of the at least one isolation ring 1121. It can form an appropriate spacing distance between the upper bearings 311 and the lower oil-containing member 322 and the lower bearing 312 to reduce the friction area and frictional resistance between the upper bearings 311, lower bearing 312 and the rotating shaft 3, thereby assisting the rotating shaft 3 and the fan blade 2 to rotate more smoothly, and improving the heat dissipation effect of the fan.

The above-mentioned rotating shaft 3 of the present invention is externally equipped with at least one bearing 31, at least one oil-containing member 32 stacked on the at least one bearing 31, and at least one oil-retaining cap 33 stacked on the at least one oil-containing member 32. The at least one oil-containing member 32 can be effectively prevented from being blocked by the at least one oil-retaining cap 33, so that the at least one oil-containing member 32 will not fall out of the axle seat 11, and the grease released by it will not leak out of the rotating shaft 3 to ensure proper lubrication between the rotating shaft 3 and the at least one bearing 31. At the same time, the at least one oil-retaining cap 33 and the at least one oil-containing member 32 can also prevent the external environmental dust, fine chips, or foreign matter such as acid, alkali and salt from easily penetrating between the rotating shaft 3 and the bearing 31, thereby reducing the rotational friction between the rotating shaft 3 and the bearing 31 and the losses caused by friction, also improving the tolerance of the bearing 31 to form good contact with the rotating shaft 3 for smooth rotation, keeping the fan frame 1 and the fan blade 2 clean, and not easily adhering to grease and foreign matter from the external environment to extend the service life of the fan.

Figure 5:
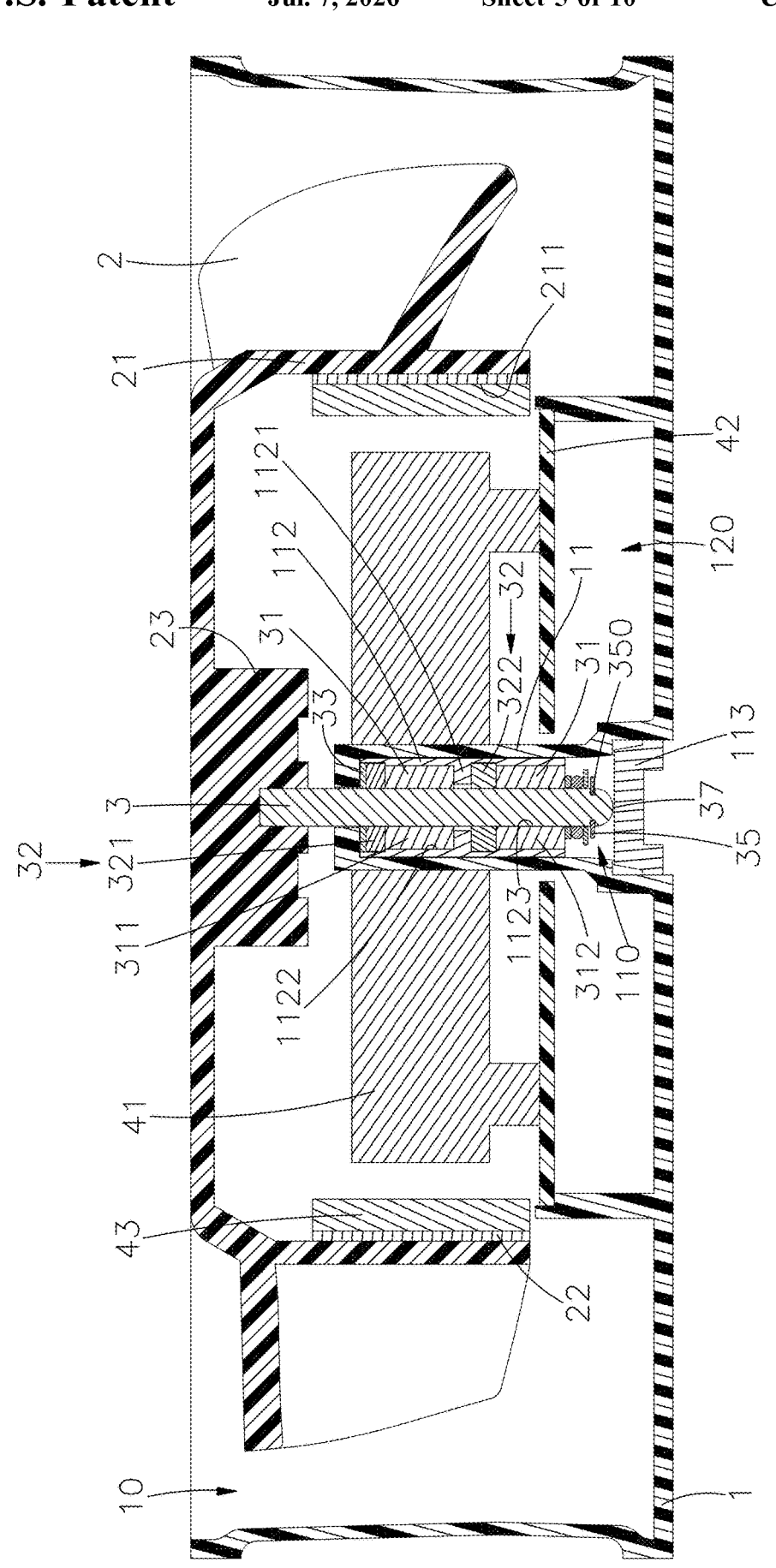
FIG. 5 is a side cross-sectional view of the third embodiment of the present invention.

Please refer to FIG. 5, which is a side cross-sectional view of the third embodiment of the present invention. As shown in the figure, it can be clearly seen that the axle seat 11 is protruded in the accommodating space 10 of the fan frame 1 of the present invention and the inside of the axle seat 11 has an accommodating groove 110 that extends to the outside of the bottom. The rotating shaft 3 has one end thereof assembled at the fan blade 2, and an opposite end thereof extended into the accommodating groove 110 assembled in the axle seat 11 of the fan frame 1. The rotating shaft 3 in the accommodating groove 110 is externally mounted with a bearing bracket 112. At least one isolation ring 1121 is protruded inside the bearing bracket 112. The outside of the rotating shaft 3 is mounted with at least two stacked upper bearings 311, an upper oil-containing member 321, a lower bearing 312, and a lower oil-containing member 322, which are respectively located in the upper space 1122 and lower space 1123 of the at least one isolation ring 1121. It can form an appropriate spacing distance between the upper bearing 311 and the lower oil-containing member 322 and the lower bearing 312 to reduce the friction area and frictional resistance between the upper bearing 311 and lower bearing 312 and the rotating shaft 3. At least one oil-retaining cap 33 is stacked on at least one oil-containing member 32. At least one retaining ring 35 is assembled on the outside of the rotating shaft 3 below the lower bearing 312. At least one wear-resistant washer 36 is provided between any retaining rings 35 and the bearing 31, and a wear-resistant bottom cover 113 is provided in the accommodating groove 110 below the lower bearing 312 and the retaining ring 35. One side of the end portion 37 of the rotating shaft 3 in the accommodating groove 110 is against the bottom cover 113. The end portion 37 can be bowl-shaped or hemispherical to reduce the contact area between the end portion 37 and the bottom cover 113 to reduce frictional resistance. This is to prevent the bearings 31 from being thrown out and sliding up and down when the fan blade 2 is running at extremely high speed. The stator silicon steel sheet set 41 extends to the rotor magnet 43 located outside the axle seat 11 and assembled at the fan blade 2. The at least one oil-containing member 32 set on the outside of the rotating shaft 3 can be an elastic oil-absorbing sponge or other elastic oil-containing member 32 that can contain lubricating oil. After the oil-containing member 32 is filled with oil, its oil film can contact the rotating shaft 3 to fill the gap formed between the rotating shaft 3 and the oil-containing member 32 and will not affect the operation of the rotating shaft 3, and can absorb the vibration and shaking caused by the rotation of the rotating shaft 3 and the bearings 31. It can also prevent external environmental dust, fine chips, or foreign matter such as acid, alkali and salt from easily penetrating between the rotating shaft 3 and the bearing 31, thereby allowing the rotating shaft 3 and the bearing 31 to rotate more stably, being less likely to increase the frictional resistance, and reducing the losses caused by friction. This can effectively reduce the noise generated by the rotation between the rotating shaft 3 and the bearings 31, thereby improving the quietness of the fan during operation, and effectively extending the service life of the fan. This in turn assists the rotating shaft 3 and the fan blade 2 to rotate more smoothly, and improves the heat dissipation effect of the fan.

Figure 6:
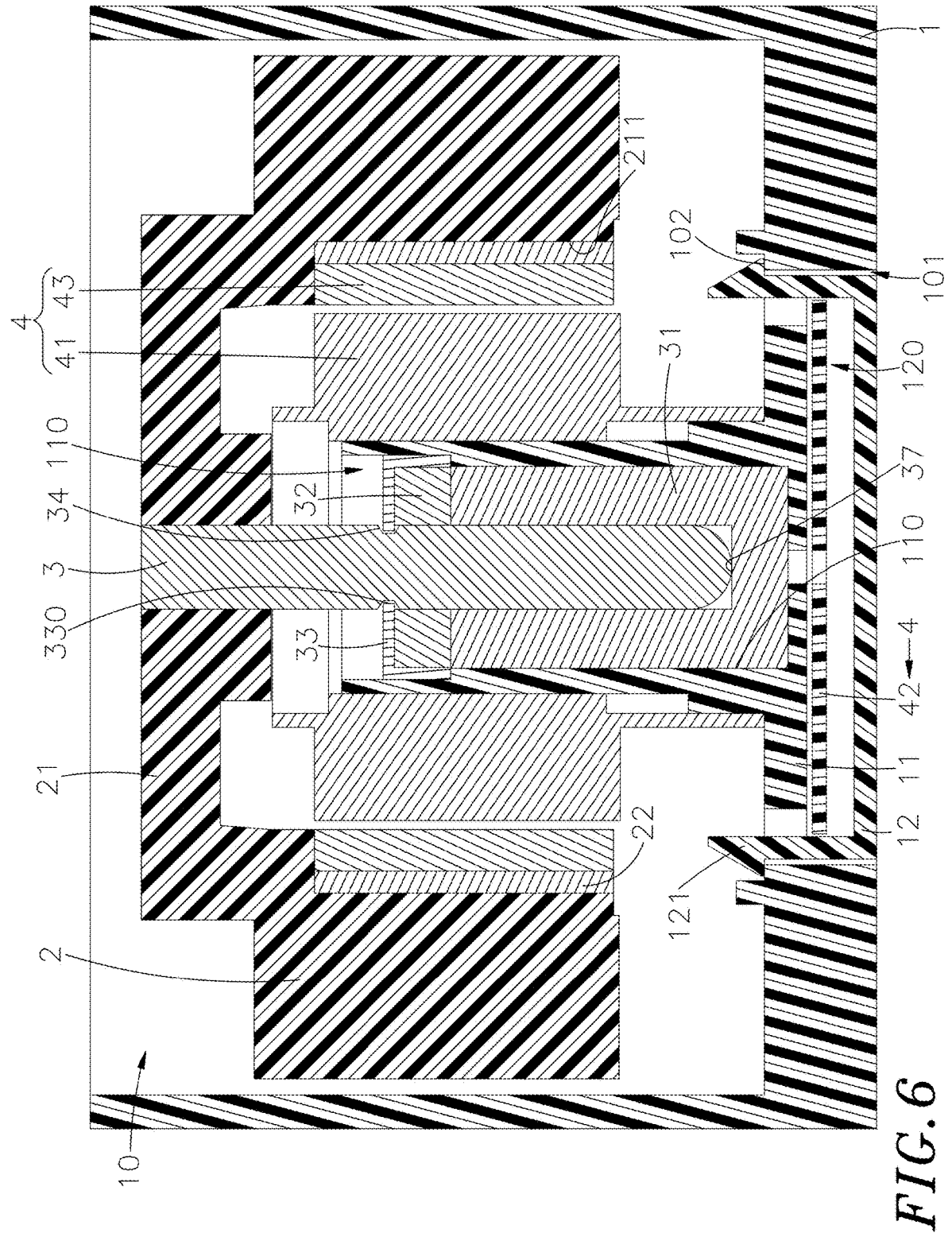
FIG. 6 is a side cross-sectional view of the fourth embodiment of the present invention.

Please refer to FIG. 6, which is a side cross-sectional view of the fourth embodiment of the present invention. As shown in the figure, it can be clearly seen that the fan frame 1 of the present invention comprises a hollow assembly hole 101 at the bottom of the accommodating space 10. The bottom of the accommodating space 10 inside the assembly hole 101 is provided with a retaining shoulder 102, and the assembly hole 101 can be used to assemble a bottom frame base 12. The bottom frame base 12 is provided with a retaining portion 121 on one side, which can be embedded at the retaining shoulder 102 inside the assembly hole 101, so that the bottom frame base 12 can be positioned at the assembly hole 101. The bottom frame base 12 has a storage space 120 inside for assembling the circuit board 42 of the driving unit 4. There is an axle seat 11 above the storage space 120 on the circuit board 42 for the bottom frame base 12 to be positioned at the axle seat 11. The stator silicon steel sheet set 41 of the driving unit 4 is assembled outside the axle seat 11. The stator silicon steel sheet set 41 is electrically connected to the circuit board 42 at the bottom of the axle seat 11. The rotating shaft 3 has one end thereof assembled at the fan blade 2, and an opposite end thereof extended into the accommodating groove 110 inside the axle seat 11 of the fan frame 1. The rotor magnet 43 assembled at the inner side of the fan blade 2 faces the outside of the stator silicon steel sheet set 41. The outside of the rotating shaft 3 located in the accommodating groove 110 can be equipped with at least one bearing 31, at least one oil-containing member 32 stacked on the at least one bearing 31, and at least one oil-retaining cap 33 stacked on the at least one oil-containing member 32. At least one rotating shaft groove 34 is provided on the outside of the rotating shaft 3. The oil-retaining cap 33 can be U-shaped. There is a shaft hole 330 in the center of the oil-retaining cap 33, and its hole diameter is smaller than the outer diameter of the rotating shaft 3 and larger than the inner diameter of the rotating shaft groove 34. The shaft hole 330 corresponds to the rotating shaft groove 34. The at least one oil-retaining cap 33 can be made of elastic plastic material. When the rotating shaft 3 penetrates the at least one oil-containing member 32, then it penetrates into the at least one bearing 31, so that the at least one rotating shaft groove 34 on the rotating shaft 3 is positioned at the at least one shaft hole 330. At this time, the area of at least one shaft hole 330 is affected by the elastic restoring force to rebound and embed in the at least one rotating shaft groove 34, and forms a blocking limit. When the fan blade 2 on one end of the rotating shaft 3 rotates at a high speed, the axial force generated may drive the rotating shaft 3 to float and shift along the axial direction. When the rotating shaft 3 floats and displaces so that the at least one rotating shaft groove 34 is positioned against the shaft hole 330 of the at least one oil-retaining cap 33, the at least one rotating shaft groove 34 resists the shaft hole 330 of the at least one oil-retaining cap 33 to achieve the purpose of limiting the axial floating and displacement of the rotating shaft 3. It can block the axial floating and displacement of the rotating shaft 3, and can effectively prevent the rotating shaft 3 from axially detaching from the outside of the at least one bearing 31, the at least one oil-containing member 32 and the at least one oil-retaining cap 33, so that the rotating shaft 3 can rotate stably at the accommodating groove 110 of the axle seat 11.

In addition, the at least one oil-retaining cap 33 is provided outside the rotating shaft 3 at the top of the at least one oil-containing member 32, and the at least one oil-retaining cap 33 is provided with a shaft hole 330; and the at least one oil-containing member 32 can be an elastic oil-absorbing sponge or other oil-containing member 32 that can contain lubricating oil. After the oil-containing member 32 is filled with oil, the oil film on its inner diameter can contact the rotating shaft 3 to fill the gap between the oil-containing member 32 and the rotating shaft 3 (i.e., the shaft core). By utilizing the protective effect of the at least one oil-retaining cap 33, it is possible to prevent external environmental dust, fine particles, or foreign matter such as acid, alkali, and salt from penetrating between the rotating shaft 3 and the bearing 31, thereby stabilizing the rotation of the rotating shaft 3 and the bearing 31 and reducing the frictional resistance and the losses caused by friction. This can effectively reduce the noise generated by the rotation between the rotating shaft 3 and the bearings 31, thereby improving the quietness of the fan during operation, and effectively extending the service life of the fan.

Figure 7:
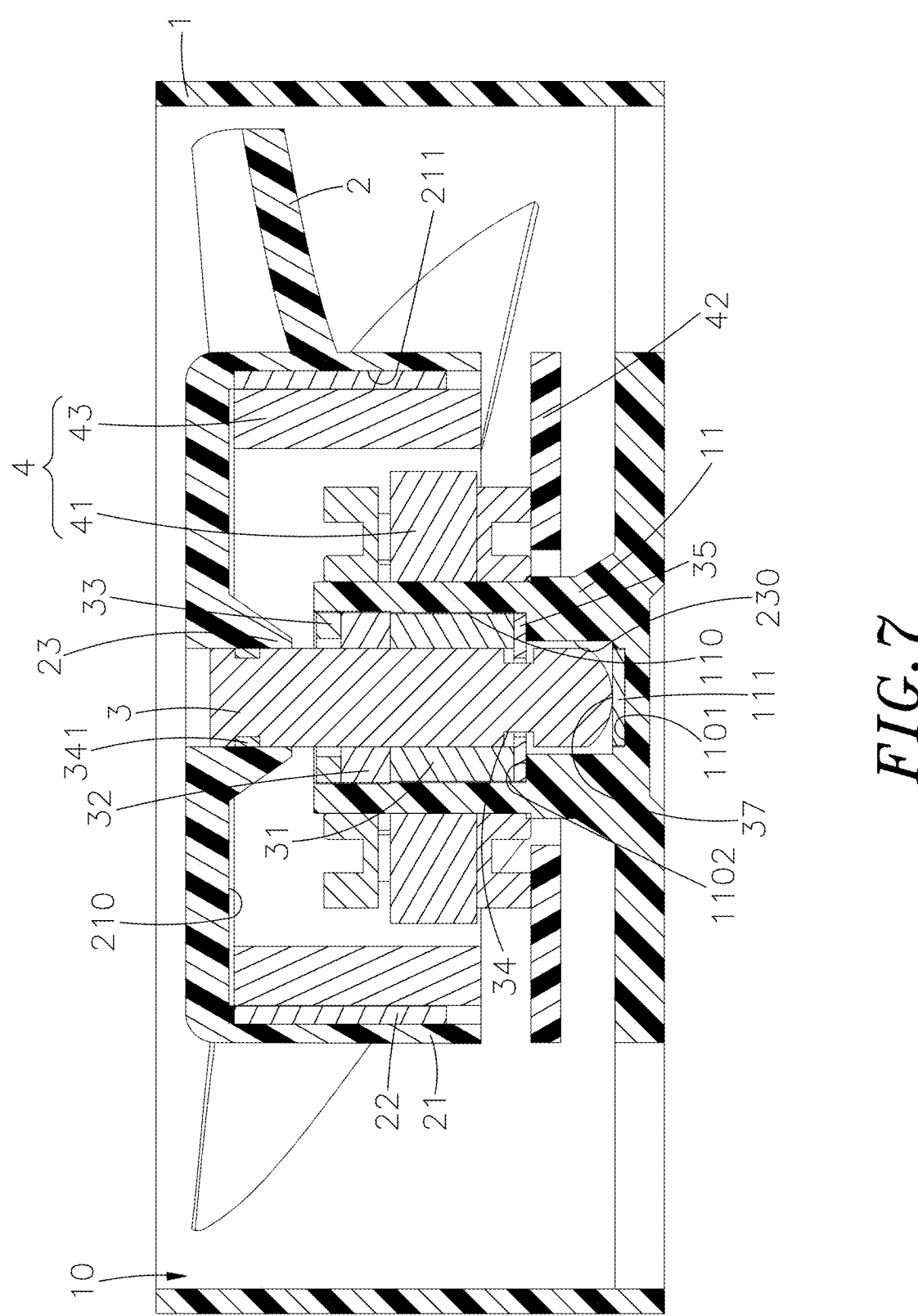
FIG. 7 is a side cross-sectional view of the fifth embodiment of the present invention.

Please refer to FIG. 7, which is a side cross-sectional view of the fifth embodiment of the present invention. As shown in the figure, it can be clearly seen that the fan frame 1 of the present invention has an axle seat 11 protruding in the accommodating space 10, and the axle seat 11 has an accommodating groove 110 inside, and a receiving groove 230 with a reduced aperture is provided at the bottom of the accommodating groove 110, so that an inner shoulder 1102 is formed between the accommodating groove 110 and the receiving groove 230. The rotating shaft 3 has one end thereof assembled in the accommodating groove 110 of the axle seat 11 of the fan frame 1 and the receiving groove 230, and an opposite end thereof extended to a rotating shaft seat 23 assembled inside the fan blade 2. The rotating shaft seat 23 is set in the center of the receiving space 210 of the hub 21 of the fan blade 2. The rotating shaft 3 is embedded in the rotating shaft seat 23 by insert molding. The rotating shaft 3 is provided with a mounting groove 341, so that the rotating shaft 3 can be embedded and injected with plastic to form a tight bond with the rotating shaft seat 23 and is not easy to be detached from the rotating shaft seat 23. The rotating shaft 3 located in the accommodating groove 110 can be externally mounted with at least one bearing 31 (the bearing 31 is located in the accommodating groove 110 and fixed on the axle seat 11, leaving a gap between the rotating shaft 3 and the bearing 31), at least one oil-containing member 32 stacked on the at least one bearing 31, at least one oil-retaining cap 33 stacked on the at least one oil-containing member 32, and at least one retaining ring 35 assembled externally on the rotating shaft 3. The retaining ring 35 resists the inner shoulder 1102 between the accommodating groove 110 and the receiving groove 230. And a wear-resistant gasket 111 can be provided at the bottom of an inner groove 1101, so that one side of the end portion 37 of the rotating shaft 3 in the accommodating groove 110 can be pressed against the wear-resistant gasket 111 to limit the rotating shaft 3 from sliding up and down when the fan blade 2 of the fan is running at extremely high speed. At the bottom of the accommodating space 10 outside the axle seat 11, the stator silicon steel sheet set 41 of the driving unit 4 (which includes multiple silicon steel sheets and enameled wire winding sets, etc.) and the circuit board 42 can be installed. The stator silicon steel sheet set 41 extends to the rotor magnet 43 located on the side of the axle seat 11 and assembled at the fan blade 2. The at least one oil-containing member 32 set on the outside of the rotating shaft 3 can be an elastic oil-absorbing sponge or other elastic oil-containing member 32 that can contain lubricating oil. The gap formed between the oil-containing member 32 and the rotating shaft 3 can be filled by the oil film in the inner hole of the oil-containing member 32 contacting the rotating shaft 3 to block the intrusion of dust and other foreign objects into the gap between the rotating shaft 3 and the bearing 31. It can also prevent external environmental dust, fine chips, or foreign matter such as acid, alkali and salt from easily penetrating between the rotating shaft 3 and the bearing 31, thereby allowing the rotating shaft 3 and the bearing 31 to rotate more stably, reducing the frictional resistance and the losses caused by friction. This can effectively reduce the noise generated by the rotation of the rotating shaft 3 and the bearings 31, thereby improving the quietness of the fan during operation, and effectively extending the service life of the fan.

Please refer to FIG. 8, which is a side cross-sectional view of the sixth embodiment of the present invention. As shown in the figure, it can be clearly seen that the fan frame 1 of the present invention has an axle seat 11 protruding in the accommodating space 10, and the axle seat 11 has an accommodating groove 110 inside. At the bottom of the accommodating space 10 outside the axle seat 11, the stator silicon steel sheet set 41 of the driving unit 4 (which includes multiple silicon steel sheets and enameled wire winding sets, etc.) and the circuit board 42 can be installed. The stator silicon steel sheet set 41 extends to the rotor magnet 43 located on the side of the axle seat 11 and assembled at the fan blade 2. The fan blade 2 is provided with a rotating shaft bearing seat 24 with a receiving groove 230 and a bearing groove 231 in the center of the receiving space 210 of the hub 21. The rotating shaft bearing seat 24 can be equipped with at least one bearing 31, at least one oil-containing member 32 stacked under the at least one bearing 31, and at least one oil-retaining cap 33 stacked under the at least one oil-containing member 32 inside. And a retaining ring 35 is assembled between the top of the at least one bearing 31 and the inner shoulder 1102, so that the retaining ring 35 can be pressed against the inner shoulder 1102 between the bearing groove 231 and the receiving groove 230 by the bearing 31. The inner periphery of the retaining ring 35 can be retained in the rotating shaft groove 34 of the rotating shaft 3. And a wear-resistant gasket 111 can be provided at the bottom of the inner groove 1101, so that one side of the end portion 37 of the rotating shaft 3 in the accommodating groove 110 can be pressed against the wear-resistant gasket 111 to limit the rotating shaft bearing seat 24 on the fan blade 2 from sliding up and down when the fan blade 2 of the fan is running at extremely high speed. At least one oil-containing member 32 is set on the outside of the rotating shaft 3. The oil-containing member 32 can be an elastic oil-absorbing sponge or other elastic oil-containing member 32 that can contain lubricating oil. The gap formed between the oil-containing member 32 and the rotating shaft (shaft core) 3 can be filled by the oil film in the inner hole of the oil-containing member 32 contacting the rotating shaft 3 to block the intrusion of dust and other foreign objects into the gap between the rotating shaft 3 and the bearing 31. It can also prevent external environmental dust, fine chips, or foreign matter such as acid, alkali and salt from the easily penetrating between the rotating shaft 3 and the bearing 31, thereby allowing the rotating shaft (shaft core) 3 and the bearing 31 to rotate more stably, and reducing the frictional resistance and the losses caused by friction. This can effectively reduce the noise generated by the rotation of the rotating shaft 3 and the bearings 31, thereby improving the quietness of the fan during operation, and effectively extending the service life of the fan.

Figure 9:
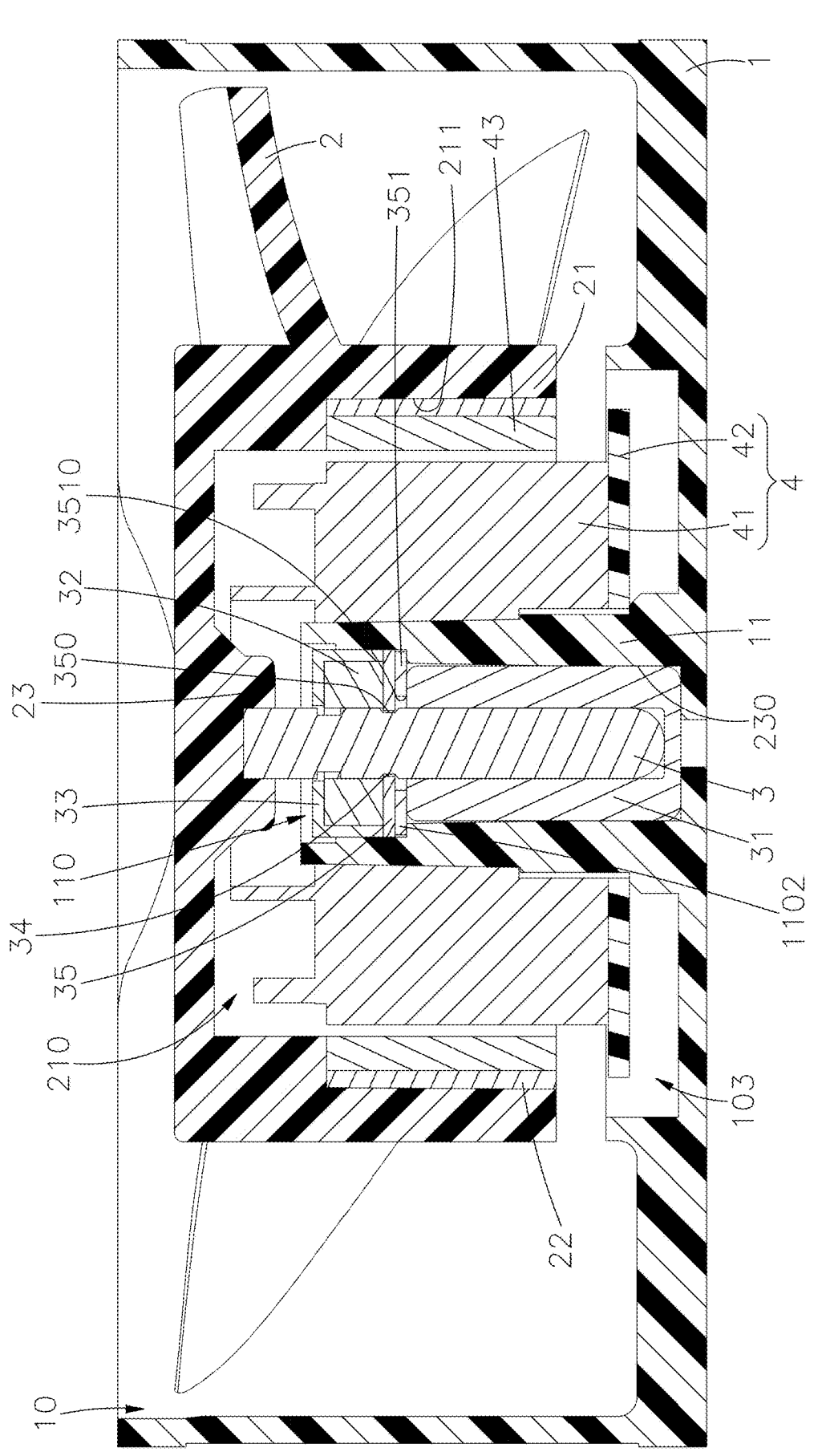
FIG. 9 is a side cross-sectional view of the seventh embodiment of the present invention.

Please refer to FIG. 9, which is a side cross-sectional view of the seventh embodiment of the present invention. As shown in the figure, it can be clearly seen that the fan frame 1 of the present invention is provided with a storage slot 103 at the bottom of the accommodating space 10, and an axle seat 11 is protruded in the storage slot 103. At the outside of the axle seat 11, the stator silicon steel sheet set 41 of the driving unit 4 (which includes multiple silicon steel sheets and enameled wire winding sets, etc.) and the circuit board 42 can be installed. The stator silicon steel sheet set 41 extends to the rotor magnet 43 located on the side of the axle seat 11 and assembled at the fan blade 2. Furthermore, a rotating shaft seat 23 is provided in the center of the receiving space 210 of the hub 21 of the receiving space 210 inside the fan blade 2. Thus, the one side of the rotating shaft 3 can be embedded and injected with plastic on the rotating shaft seat 23, and the other side of the rotating shaft 3 can be extended to the inner hole of the bearing 31 assembled in the accommodating groove 110 and the receiving groove 230 of the axle seat 11 of the fan frame 1. The outside of the rotating shaft 3 in the accommodating groove 110 and the receiving groove 230 can be equipped with at least one bearing 31, at least one oil-containing member 32 stacked on the at least one bearing 31, and at least one oil-retaining cap 33 stacked on the at least one oil-containing member 32. At least one rotating shaft groove 34 can be provided outside the rotating shaft 3. And at least one retaining ring 35 is assembled corresponding to at least one rotating shaft groove 34. A heightening spacer 351 is placed between the bottom of the at least one retaining ring 35 and the inner shoulder 1102. The heightening spacer 351 is provided with an inner ring hole 3510, and the diameter of the inner ring hole 3510 is larger than the inner shaft hole 350 of the retaining ring 35 and even larger than the rod diameter of the rotating shaft 3. The at least one retaining ring 35 can be made of elastic plastic material.

When the rotating shaft 3 penetrates into the at least one oil-containing member 32 and then penetrates into the retaining ring 35 and the heightening spacer 351, the outer diameter of the rotating shaft 3 will resist the periphery of the inner shaft hole 350 of the at least one retaining ring 35, and press and deform the at least one retaining ring 35, causing the inner shaft hole 350 to fall into the inner ring hole 3510 of the heightening spacer 351 due to the resistance of the rotating shaft 3. When the rotating shaft 3 is penetrated into the at least one bearing 31, so that the at least one rotating shaft groove 34 on the rotating shaft 3 is located at the at least one retaining ring 35, the area of the inner shaft hole 350 of the at least one retaining ring 35 is subject to elastic restoring force to rebound and embed in the at least one rotating shaft groove 34, thereby forming a blocking limit. And when the fan blade 2 on one end of the rotating shaft 3 rotates at high speed, the axial force generated may drive the rotating shaft 3 to float and shift along the axial direction. When the rotating shaft 3 floats and displaces, the at least one rotating shaft groove 34 resists the inner shaft hole 350 of the at least one retaining ring 35, achieving the purpose of limiting the rotating shaft 3 from axial floating and displacement. It can block the axial floating and displacement of the rotating shaft 3, and can effectively prevent the rotating shaft 3 from axially detaching from the outside of the at least one bearing 31, the at least one oil-containing member 32 and the at least one oil-retaining cap 33, so that the rotating shaft 3 rotates stably at the accommodating groove 110 of the axle seat 11 and receiving groove 230.

In addition, at least one oil-retaining cap 33 can be set on the outside of the rotating shaft 3 at the top of the at least one oil-containing member 32, and the at least one oil-retaining cap 33 is provided with a shaft hole 330, and the hole diameter of the shaft hole 330 can be smaller than the outer diameter of the rotating shaft 3 and larger than the inner diameter of the rotating shaft groove 34. In addition, the at least one oil-containing member 32 can be an elastic oil-absorbing sponge or other oil-containing member 32 that can contain lubricating oil. After the oil-containing member 32 is filled with oil, the oil film in its inner diameter can contact the rotating shaft 3 to fill the gap formed between the rotating shaft 3 and the oil-containing member 32. Utilizing the protective effect of the at least one oil-retaining cap 33, it is possible to prevent external environmental dust, fine particles, or foreign matter such as acid, alkali, and salt from penetrating between the rotating shaft 3 and the bearing 31. It has the advantages of making the rotation of the rotating shaft 3 and the bearing 31 more stable, not easy to increase frictional resistance, and can also reduce the losses caused by friction. This can effectively reduce the noise generated by the rotation of the rotating shaft 3 and the bearings 31, thereby improving the quietness of the fan during operation, and effectively extending the service life of the fan.

Figure 10:
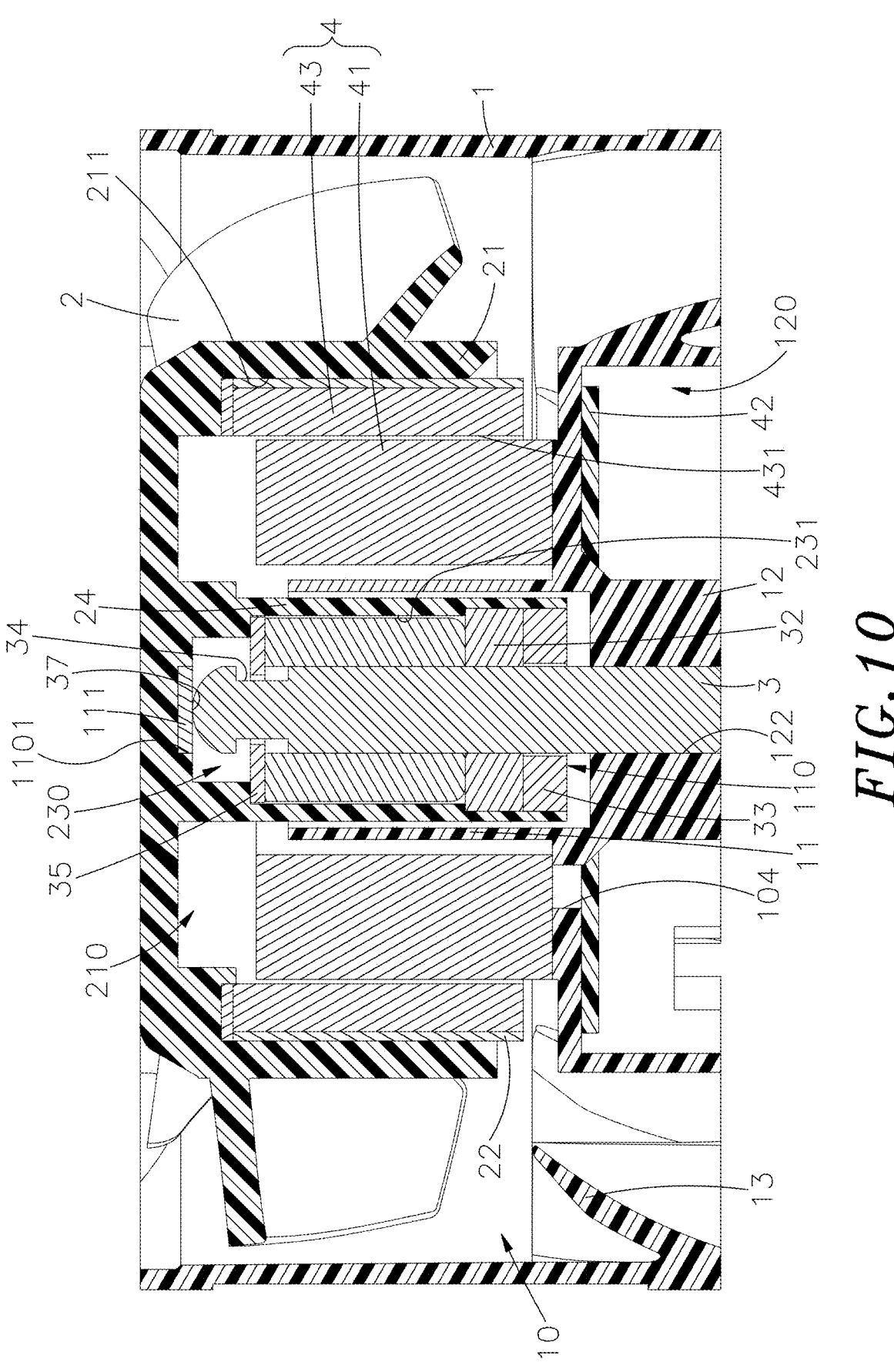
FIG. 10 is a side cross-sectional view of the eighth embodiment of the present invention.

Another fan wheel heat dissipation structure can also achieve the same effect as above. Please refer to FIG. 10, which is a side cross-sectional view of the eighth embodiment of the present invention, which comprises a fan frame 1 and a fan blade 2. The axle seat 11 at the bottom of the accommodating space 10 of the fan frame 1 of the present invention extends downward and provides with a storage space 120, and the storage space 120 is provided with a circuit board 42 inside. The radial outer side of the storage space 120 is provided with a static impeller pressure plate 13. The stator silicon steel sheet set 41 (including multiple silicon steel sheets and enameled wire winding sets, etc.) of the driving unit 4 can be installed on the outside of axle seat 11. The stator silicon steel sheet set 41 extends to the outer part of the axle seat 11 and faces the rotor magnet 43 assembled at the fan blade 2. The rotating shaft bearing seat 24 is set in the center of the receiving space 210 of the hub 21 of the receiving space 210 inside the fan blade 2. One end of the rotating shaft 3 is embedded and injected with plastic on the bottom frame base 12. The other end of the rotating shaft 3 is extended to the inner hole of the bearing 31 assembled in the bearing groove 231 of the rotating shaft bearing seat 24 of the fan blade 2. The outside of the rotating shaft 3 in the rotating shaft bearing seat 24 and the bearing groove 231 can install at least one bearing 31, at least one oil-containing member 32 stacked under the at least one bearing 31, and at least one oil-retaining cap 33 stacked under the at least one oil-containing member 32. At least one rotating shaft groove 34 is provided on the outside of the rotating shaft 3 corresponding to the at least one retaining ring 35. The at least one retaining ring 35 can be made of elastic plastic material. A wear-resistant gasket 111 can be provided at the bottom of the inner groove 1101, which allows one side of the end portion 37 of the rotating shaft 3 in the accommodating groove 110 to abut against the wear-resistant gasket 111.

When the rotating shaft 3 penetrates into the at least one oil-containing member 32 and then penetrates into the bearing 31 and the at least one retaining ring 35, the outer diameter of the rotating shaft 3 will resist the periphery of the inner shaft hole 350 of the at least one retaining ring 35, and press and deform the at least one retaining ring 35, causing the inner shaft hole 350 to fall into the receiving groove 230 due to the resistance of the rotating shaft 3. When the rotating shaft 3 penetrates into the at least one bearing 31, so that the at least one rotating shaft groove 34 on the rotating shaft 3 is located at the at least one retaining ring 35. At this time, the inner shaft hole 350 of the at least one retaining ring 35 is affected by the elastic restoring force to rebound and embed in the at least one rotating shaft groove 34, and form a blocking limit. Then, when the fan blade 2 on one end of the rotating shaft 3 rotates at high speed or vibrates up and down due to an external force, the axial force generated may drive the rotating shaft 3 to float and shift along the axial direction. When the rotating shaft 3 floats and displaces so that the at least one rotating shaft groove 34 is located at the at least one retaining ring 35, the at least one rotating shaft groove 34 resists the inner shaft hole 350 of the at least one retaining ring 35 to achieve the purpose of limiting the rotating shaft 3 from the axial floating and displacement. It can block the axial floating and displacement of the rotating shaft 3, and can effectively prevent the rotating shaft 3 from axially detaching from the outside of the at least one bearing 31, the at least one oil-containing member 32 and the at least one oil-retaining cap 33. And a wear-resistant gasket 111 can be provided at the bottom of the inner groove 1101, so that one side of the end portion 37 of the rotating shaft 3 in the accommodating groove 110 can be pressed against the wear-resistant gasket 111. There is a gap between the axle seat 11 on the bottom frame base 12 and the rotating shaft bearing seat 24 on the fan blade 2, so that the rotating shaft bearing seat 24 on the fan blade 2 can rotate stably at the accommodating groove 110 of the bottom frame base 12.

In addition, at least one oil-retaining cap 33 can be set on the outside of the rotating shaft 3 at the bottom of at least one oil-containing member 32, and the at least one oil-retaining cap 33 is provided with a shaft hole 330. The hole diameter of the shaft hole 330 can be smaller than the outer diameter of the rotating shaft 3. The at least one oil-containing member 32 can be an elastic oil-absorbing sponge or other oil-containing member 32 that can contain lubricating oil. After the oil-containing member 32 is filled with oil, the oil film on its inner diameter can contact the rotating shaft 3 to fill the gap formed between the rotating shaft 3 and the oil-containing member 32. Utilizing the protective effect of the at least one oil-retaining cap 33, it is possible to prevent external environmental dust, fine particles, or foreign matter such as acid, alkali, and salt from penetrating between the rotating shaft 3 and the bearing 31. It has the advantages of making the rotation of the rotating shaft 3 and the bearing 31 more stable, not easy to increase frictional resistance, and can also reduce the losses caused by friction. This can effectively reduce the noise generated by the rotation between the rotating shaft 3 and the bearings 31, thereby improving the quietness of the fan during operation, and effectively extending the service life of the fan.

The above are only preferred embodiments of the present invention and do not limit the patent scope of the present invention. Therefore, all simple modifications and equivalent structural changes made by using the contents of the description and drawings of the present invention shall be included in the patent scope of the present invention and shall be clearly stated.

What the invention claimed is:

1. A fan shaft structure, comprising a fan frame, a fan blade, a rotating shaft and a driving unit, wherein:

said fan frame comprises an accommodating space, an axle seat with an accommodating groove is protruded in said accommodating space for said rotating shaft to be mounted in the accommodating groove of said axle seat and for a stator silicon steel sheet set and a circuit board of said driving unit to be mounted on the outside of said axle seat, wherein at least one bearing located at an outside of said rotating shaft is selectively made of copper or plastic material with a hardness of less than 50 HV, and is selectively cylindrical or "U"-shaped or both cylindrical and "U"-shaped;

said fan blade comprises a hub with a receiving space therein, an iron shell attached to the hub facing said receiving space for attaching a rotor magnet relative to the outside of said stator silicon steel sheet set to be mounted inside said iron shell, said axle seat with said accommodating groove mounted in the center of said accommodating space of said fan frame, the inside of said accommodating groove of said axle seat is provided with the at least one said bearing, at least an oil-containing member stacked on the at least one said bearing and located between the at least one said bearing and a bottom side of said fan blade, and at least an oil-retaining cap stacked on at least one said oil-containing member, a rotating shaft seat has one side thereof connected to the center of said fan blade and an opposite side thereof extended toward a top of said accommodating groove of said axle seat assembled on said fan frame and coupled with an end of the rotating shaft;

wherein the rotating shaft in the accommodating groove is externally mounted with a bearing bracket, the bearing bracket includes at least one isolation ring protruded toward inside the bearing bracket, and the outside of the rotating shaft is mounted with the at least one said bearing and the at least one oil-containing member.

2. A fan shaft structure, comprising a fan frame, a fan blade, a rotating shaft and a driving unit, wherein:

said fan frame comprises an accommodating space, an axle seat with an accommodating groove is protruded in said accommodating space for said rotating shaft to be mounted in the accommodating groove of said axle seat and for a stator silicon steel sheet set and a circuit board of said driving unit to be mounted on the outside of said axle seat;

said fan blade comprises a hub with a receiving space therein, an iron shell attached to the hub facing said receiving space for attaching a rotor magnet relative to the outside of said stator silicon steel sheet set to be mounted inside said iron shell, said axle seat with said accommodating groove mounted in the center of said accommodating space of said fan frame, the inside of said accommodating groove of said axle seat is provided with at least one said bearing, at least an oil-containing member stacked on the at least one said bearing and located between the at least one said bearing and a bottom side of said fan blade, and at least an oil-retaining cap stacked on at least one said oil-containing member, a rotating shaft seat has one side thereof connected to the center of said fan blade and an opposite side thereof extended to a top of said accommodating groove of said axle seat assembled on said fan frame and coupled with an end of the rotating shaft, wherein the at least one said oil-retaining cap is provided with a shaft hole with a hole diameter smaller than the outer diameter of said rotating shaft; said rotating shaft comprises a groove and is further mounted with a retaining ring at a bottom side of at least one said oil-retaining cap;

wherein the rotating shaft in the accommodating groove is externally mounted with a bearing bracket, the bearing bracket includes at least one isolation ring protruded toward inside the bearing bracket, and the outside of the rotating shaft is mounted with the at least one said bearing and the at least one oil-containing member.

3. The fan shaft structure as claimed in claim 1, wherein the at least one said bearing located at the outside of said rotating shaft is a composite plastic material having a hardness below 50 HV, self-lubricating properties, friction coefficient less than 0.3, non-conductivity, and temperature resistance higher than 100 degrees C., and is selectively cylindrical or "U"-shaped or both cylindrical and "U"-shaped.

4. A fan shaft structure, comprising a fan frame, a fan blade, a rotating shaft and a driving unit, wherein:

said fan frame comprises an accommodating space, an axle seat with an accommodating groove is protruded in said accommodating space for said rotating shaft to be mounted in the accommodating groove of said axle seat and for a stator silicon steel sheet set and a circuit board of said driving unit to be mounted on the outside of said axle seat, wherein said fan blade comprises a hub with a receiving space therein, an iron shell attached to the hub facing said receiving space for a rotor magnet relative to the outside of said stator silicon steel sheet set to be mounted inside said iron shell, said axle seat with said accommodating groove mounted in the center of said accommodating space of said fan frame, the inside of said accommodating groove of said axle seat is provided with at least one said bearing, at least an oil-containing member stacked on the at least one said bearing and located between the at least one said bearing and a bottom side of said fan blade, and at least an oil-retaining cap stacked on at least one said oil-containing member, a rotating shaft seat has one side thereof connected to the center of said fan blade and an opposite side thereof extended to a top of said accommodating groove of said axle seat assembled on said fan frame and coupled with an end of the rotating shaft;

wherein the rotating shaft in the accommodating groove is externally mounted with a bearing bracket, the bearing bracket includes at least one isolation ring protruded toward inside the bearing bracket, and the outside of the rotating shaft is mounted with the at least one said bearing and the at least one oil-containing member.

5. The fan shaft structure as claimed in claim 2, wherein said oil-retaining cap is provided with said shaft hole with a hole diameter smaller than the outer diameter of said rotating shaft, and said shaft hole is set within said groove of said rotating shaft, said oil-retaining cap is inverted U-shaped.

6. The fan shaft structure as claimed in claim 3, wherein the composite plastic material is PTFE (polytetrafluoroethylene), or PEEK (polyetheretherketone).

\*    \*    \*    \*    \*